United States Patent [19]

Lanckton

[11] Patent Number: 5,216,476
[45] Date of Patent: Jun. 1, 1993

[54] PHOTOGRAMMETRIC LASER SYSTEM

[75] Inventor: Arnold H. Lanckton, Roma, N.Y.

[73] Assignee: Synectics Corporation, Fairfax, Va.

[21] Appl. No.: 775,844

[22] Filed: Oct. 15, 1991

[51] Int. Cl.$^5$ ............................................. G01C 3/02
[52] U.S. Cl. ...................................... 356/2; 356/375
[58] Field of Search .................... 356/1.2, 375, 376, 2

[56] References Cited

U.S. PATENT DOCUMENTS

| | | | |
|---|---|---|---|
| 4,146,926 | 3/1979 | Clerget et al. | 356/376 |
| 4,534,650 | 8/1985 | Clerget et al. | 356/376 |
| 4,653,316 | 3/1987 | Fukuhara | 356/376 |
| 4,700,223 | 10/1987 | Shoutaro et al. | 356/376 |

FOREIGN PATENT DOCUMENTS

| | | | |
|---|---|---|---|
| 76407 | 4/1987 | Japan | 356/1 |
| 18001 | 1/1989 | Japan | 356/375 |
| 263508 | 10/1989 | Japan | 356/375 |

*Primary Examiner*—Richard A. Rosenberger
*Attorney, Agent, or Firm*—Jon L. Roberts

[57] ABSTRACT

The close range Photogrammetric Laser System ("PLS") is an all digital system designed to measure three dimensional ("3-D") surfaces at relatively close ranges. The PLS comprises two modified stereo cameras with associated analog video and digital recording capability. Using synchronized laser illumination and X and Y cylindrical lens arrangements in each stereo camera, all laser illuminated points can be focused onto a linear detector array whose intensities are used to calculate X and Y position of a 3-D target in the image plane of each camera. Photogrammetric techniques are then used to calculate an X, Y and Z position from the X and Y positions measured in the two stereo cameras. An alternate embodiment eliminates the intermediate recording step in favor of a direct recording in the memory of a data processing system for subsequent manipulation.

10 Claims, 4 Drawing Sheets

PHOTOGRAMMETRIC LASER SYSTEM

BACKGROUND OF THE INVENTION

1. Field of the Invention

This invention relates to a process and apparatus for determining the X, Y and Z positions in a three dimensional scene at close range.

2. Background Information

The need to measure positions on a three-dimensional ("3-D") surface has long existed. In fact, the entire industry of cartography and photogrammetry has developed as a result of this long felt need.

Recently, various devices have been developed to measure 3-D surfaces at close range. Such applications have been for engineering or product line inspection purposes. For example, U.S. Pat. No. 4,653,316 to Fukuhara describes an "Apparatus Mounted On Vehicles For Detecting Road Surface Conditions." This device comprises a laser beam for illuminating a road surface for the purpose of determining the location of cracks in the road. This system, however, employs separate distance detecting means in order to determine the distance from the sensor to the illuminated area on the road and does not rely on photogrammetric technologies of data reduction. It is fundamentally a two dimensional imaging system and does not render a 3-D image of the road surface.

U.S. Pat. No. 4,842,411 to Wood describes a "Method Of Automatically Measuring The Shape of a Continuous Surface." This invention is drawn to the task inspection of manufactured parts. The system is not designed to be portable nor to create the continuous map of X, Y and Z positions which might be necessary in other applications. Further it comprises a full X-Y array of charge-coupled devices which adds to the system cost.

In addition the type of light used to illuminate the object being inspected is not constant over the object thereby possessing error which must be compensated for.

U.S. Pat. No. 4,937,445 to Leong et. al is designed to determine the distance between a reference axis and points on an object. This invention is designed to determine thicknesses of materials in a manufacturing environment. However, it does use laser illumination techniques to avoid light source problems. It is not designed to be a portable system nor to address the wide variety of photogrammetrically significant 3-D scenes that exist. The illumination technique used cause the laser beam to be split into many segments instead of relying upon a single beam illumination. Further this device only measures distances from a reference axis and does not create a full X, Y, and Z datapoint record of a scene.

U.S. Pat. No. 4,534,650 to Clerget et. al describes a "Device for Determination of the Position of Points on the Surface of a Body." This patent does describe a laser beam successively illuminating pinpoint regions on the surface of a body. Two views of a 3-D scene are taken. The images are also recorded on discrete linear photo-sensitive elements. This invention, however, requires that the sensor be moved relative to the object being imaged or vice versa in order to obtain 3-D surface data, an obvious disadvantage for field operations.

In addition to these above factors, none of these inventions is designed to be combined with other data sources or superimposed on other image data from the same scene.

It is therefore an objective of the present invention to develop a system which is both portable and very easy to use in a wide variety of photogrammetrically significant situations at close range situations requiring precise measurement of 3-D surfaces using photogrammetric methods. Further, it is an objective to create an inexpensive photogrammetric laser system that relies solely upon one-dimensional photosensitive arrays which are readily available together with a unique optical system that allows the determination of X, Y positions within an image plane using solely a single photosensitive array and the X and Y direction by moving a laser for illumination rather than relocating the system or the scene.

It is a further an objective of the present invention to create a photogrammetric laser system that can accurately detect and locate the X, Y and Z positions of an object using photogrammetric methods and use such information together with a visual image collected during the measurement.

It is another objective of the present invention to create a system whereby the X, Y and Z measurements derived can be correlated with a conventional video image of the scene.

It is a further objective of the invention to create a photogrammetric laser system that is easily calibrated through collection of data over a known surface.

Finally, it is a key objective of the Photogrammetric Laser System to accurately measure an entire scene in a very brief (less than a minute) period of time without any human intervention.

SUMMARY OF THE INVENTION

The Photogrammetric Laser System (PLS) is an all digital system designed to measure conveniently measure three Dimensional (3-D) surfaces as images using conventional photographic lenses (nominally 50 degrees filed of view) at relatively close ranges (5 to 100 meters) in a very brief period of time (less than one minute). The field unit is a compact unit (approximately 1 cubic foot or 0.02 cubic meters) containing a laser, two modified photogrammetric stereo cameras, analog video recorder, and a digital recorder. Another embodiment for use in an office or other high volume setting comprises a standard small computer with associated data processing means ranging in size from a small PC to a larger workstation, depending upon the volume of three dimensional ("3-D") processing required to be performed. In this embodiment, the intermediate step of recording for later analysis is omitted in favor of direct output from the cameras to the computer.

The unique characteristics of the PLS is the application of a laser to illuminate a small area or targets on the 3-D surface which are sensed by the two modified stereo cameras. The laser can be flexibly programmed to scan the scene illuminating the surface in any one of a variety of patterns, depending upon the type and density of 3-D information desired. For example, if many data points over a small area is required, the laser can be so programmed. Other high point density small areas can also be similarly imaged and assembled into a whole in a later data processing step.

The Field Unit is set up and aligned to be approximately perpendicular from the central location of the scene to be measured. The base between the two stereo cameras is adjusted to maintain the desired base to target ratio. A laser scanning sequence is selected to provided a desired distribution of targets. Each target is a spot on the scene to be imaged. Targets can be evenly spaced throughout the scene, in a series of profiles, or in any other distribution pattern within the 3-D scene.

The illuminated surface is imaged by the two modified stereo cameras. Each Stereo Camera has at least two 12,000 linear detector arrays, one array in the X plane and one array in the Y plane for recording the image location of the illuminated surface. This information is digitized and recorded on the digital tape recorder which can be a standard commercially available 8 mm tape recorder. Simultaneously, while recording the stereo image location, an analog image of the scene is also sensed by a conventional TV detector and recorded on an analog video recorder. Data energy from the scene reaches the TV detector via a dichroic filter. Thus the TV detector and other image data is all recorded simultaneously.

In the office the data is extracted from the digital tape via a playback machine interfaced to a digital computer. The computer calculates the precise 3-D locations of the illuminated surface of the 3-D scene using the conventional photogrammetric intersection equations. Selected analog frames can be read from the analog video recorder and digitized by a digital computer to verify the calculations, to align selected control points with other sets of data, and to perform other calibration or registration functions.

DETAILED DESCRIPTIONS OF THE DRAWINGS

Figure 1:
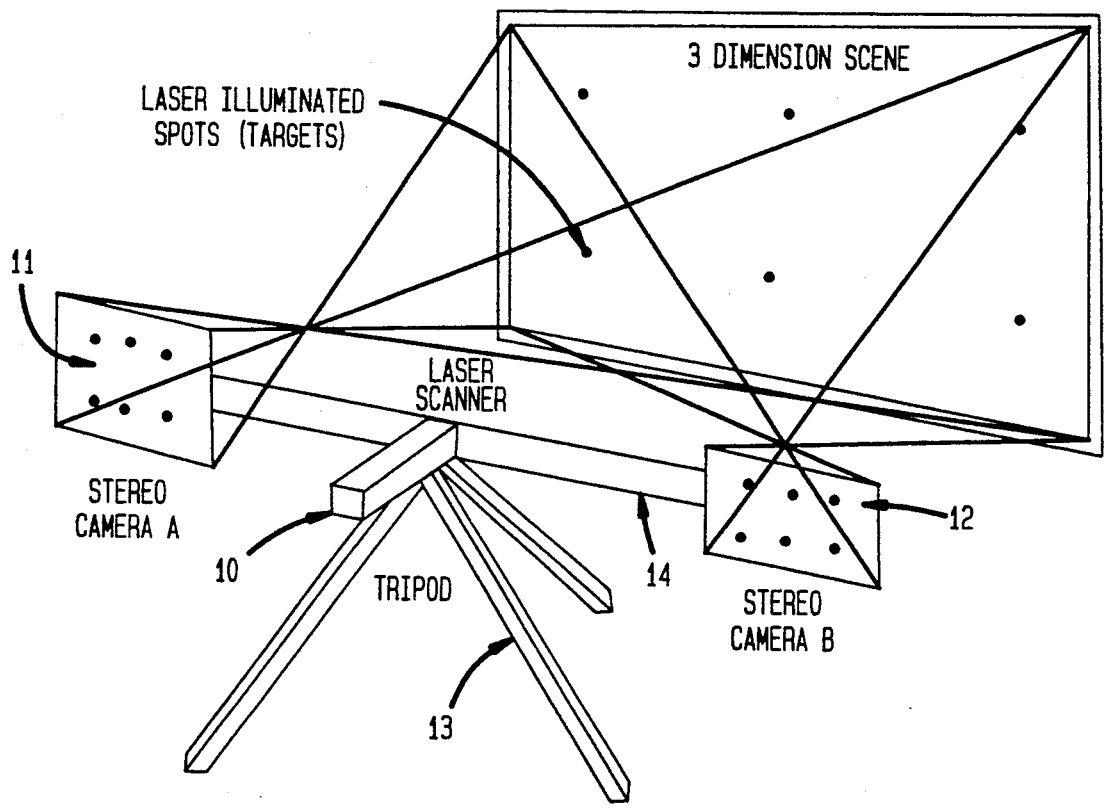
FIG. 1—General layout of the PLS Field Unit
FIG. 2—Schematic of the PLS Field Unit
FIG. 3—Schematic of the Modified Stereo Camera
FIG. 4—PLS Office Unit showing the Data Processing Steps.

Referring to FIG. 1 the PLS Field Unit is shown collecting data from a 3-D scene. The illuminating laser [10] is mounted between the two stereo cameras [11, 12] and the entire unit is mounted on a tripod [13]. The spacing between the two stereo cameras is adjustable via a rigid adjustable member [14] to maintain proper base to target distance ratio (good geometric strength) in order to obtain the required precision.

Figure 2:
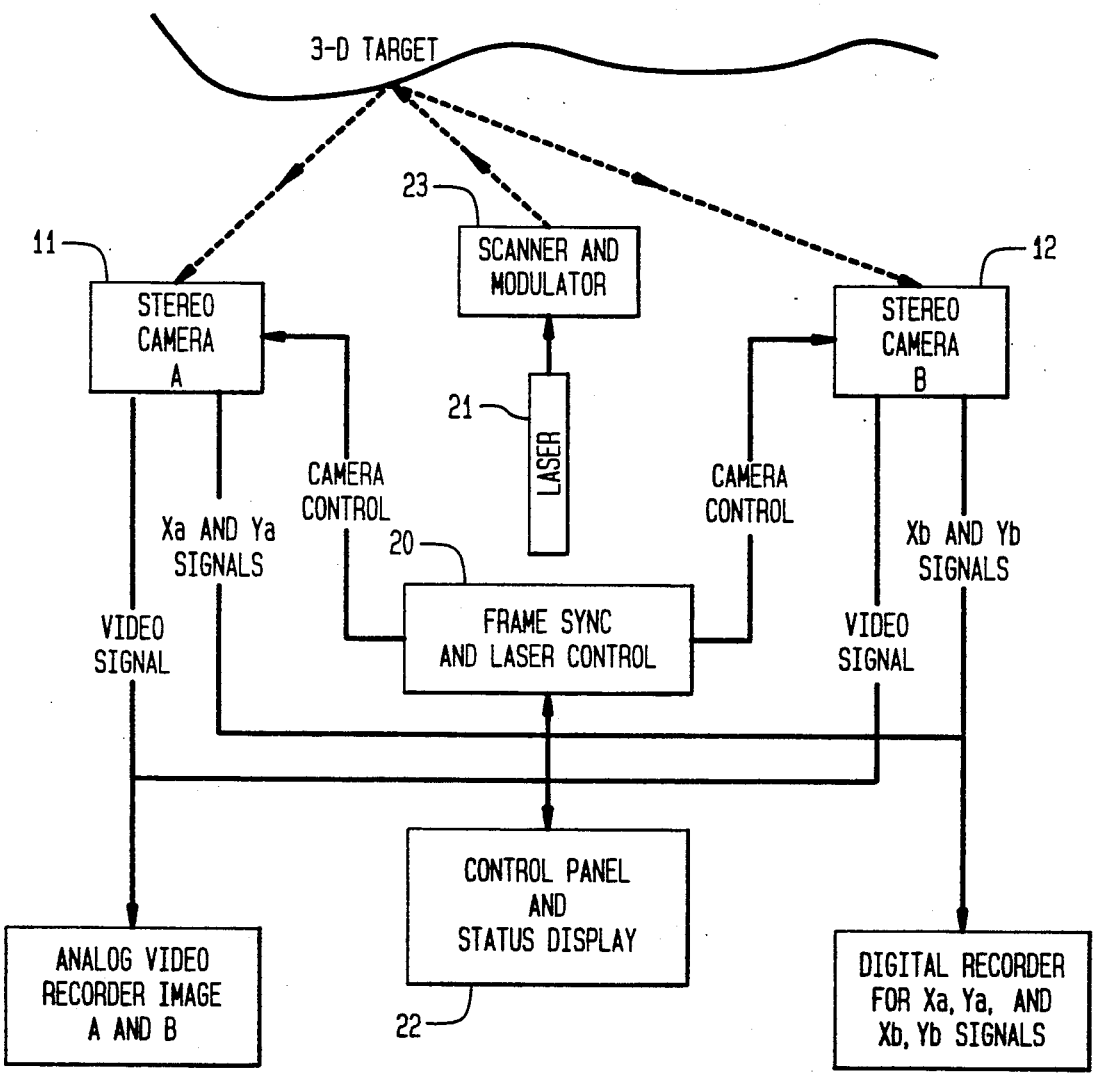

Referring to FIG. 2 a schematic of the Field Unit is shown. The field operation begins with programming the Frame Synchronization and Laser Control Unit [20] to control the laser scanning pattern and then synchronizing the laser scanning pattern [21] with video collection of the 3-D scene.

The Control Panel and Status Display [22] are used to monitor the Field Unit set up parameters and record various Field Unit settings on both the digital recorder and the analog video recorder.

The Laser Control and Sync unit [20] provides a signal to the Laser Scanner and Modulator [23] to direct the laser [21] to a programmed location in the 3-D scene [100]. The laser illuminates the 3-D surface with a small circular beam and the return is sensed by each stereo camera [11, 12]. In this way, the X and Y image plane location of the illuminated surface is detected by two cameras and recorded on tape simultaneously.

FIG. 2 illustrates the path of the laser light illuminating a surface area which is then collected by the camera lens for detection and recording of the target's location in the image plane. The Laser Scanner and Modulator [23] moves the laser beam to another location for a measurement. The frequency of locations along a scan line(s) is determined by the sampling frequency of the detector as discussed below. This sequence of laser illumination and data sampling is repeated until a desired scan line(s) is completed. Simultaneous with illuminating a scan line(s), an analog video image of the scene is also recorded to create an image record, to provide a method for identifying control points, and for reference purposes. The synchronization function of the Frame Sync and Laser Control [20] provides control between the 3-D data collection and the video image collection.

Figure 3:
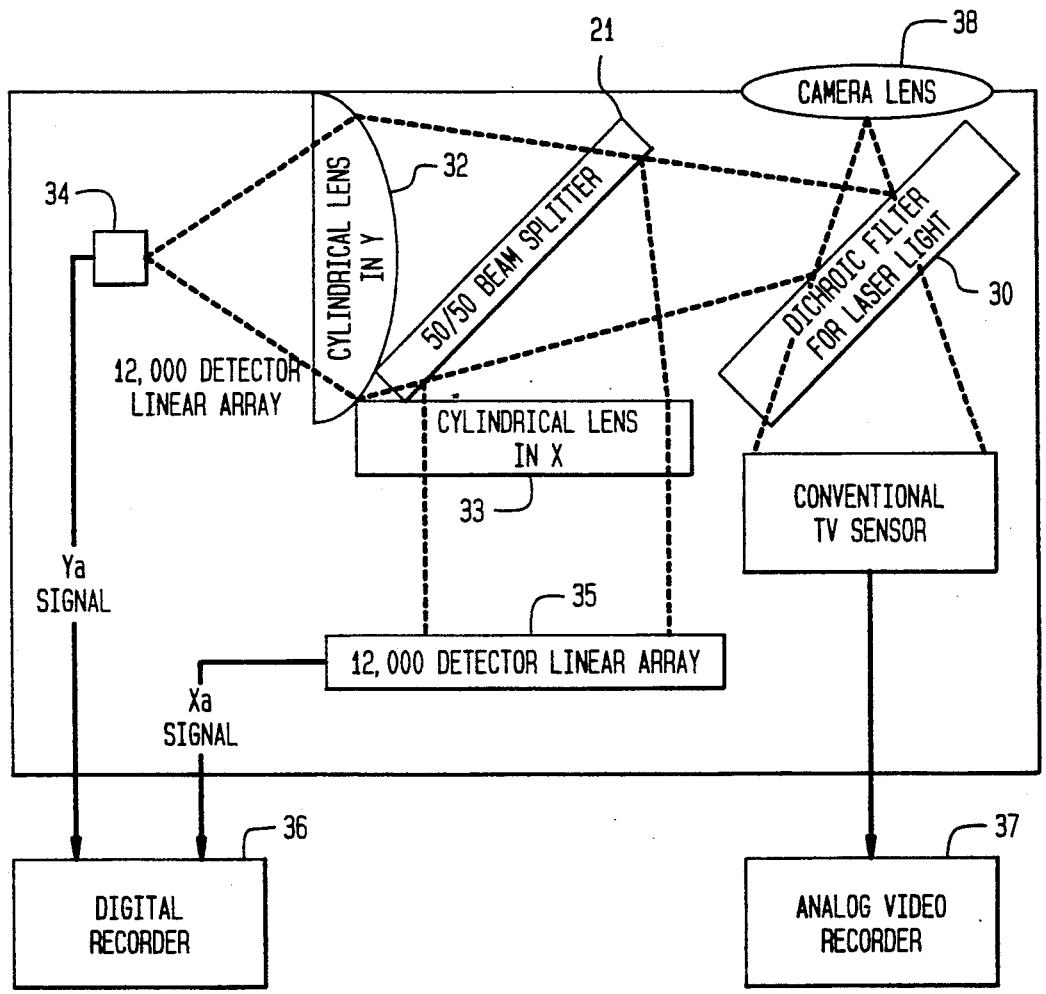

Referring to FIG. 3 the modified Stereo Camera is described. The modified Stereo Camera simplifies the recording of the X and Y locations of the target in the image plane. This simplification is accomplished in the following fashion: a normal camera lens [38] whose focal length may vary depending upon the scene being imaged/recorded permits reflected laser energy from the scene to reach a dichroic filter. The dichroic filter [30] reflects 95% of the laser's energy to a 50—50 beam splitter [31]. The 50—50 beam splitter directs the laser's energy into two cylindrical lenses [32, 33]. One cylindrical lens is placed so that the lens axis is parallel to the camera's X direction (parallel to the base) and the other cylindrical lens is placed so that the lens axis is parallel to the camera's Y direction (perpendicular to the base). Each cylindrical lens collects the illumination from a surface and always focuses the illumination onto a linear detector array regardless of its location perpendicular to the array [34, 35]. Thus each stereo camera can sense at least 12,000 locations in X and 12,000 locations in Y. Current manufacturing limits of linear detector arrays is about 12,000 discrete detector elements. If grater precision is required manufacturing limits may be improved or multiple linear detector arrays can be aligned end to end, to create 12,000×N locations (where N is the number of aligned arrays).

Each cylindrical lens [32, 33] focuses the return from the laser illuminated area as a line on adjacent detector elements within each linear array. The length and the intensity of this line varies depending upon the location of the illuminated area within the image plane. (The intensity and length characteristics of the line will also vary depending upon the focal length of the cylindrical lens and its location in the optical path, but these characteristics are a function of X and Y locations and can be accommodated for.)

After data has been collected in the field, the tape from the digital recorder [36] and the tape from the analog video recorder [37] are returned to the office for data reduction.

Figure 4:
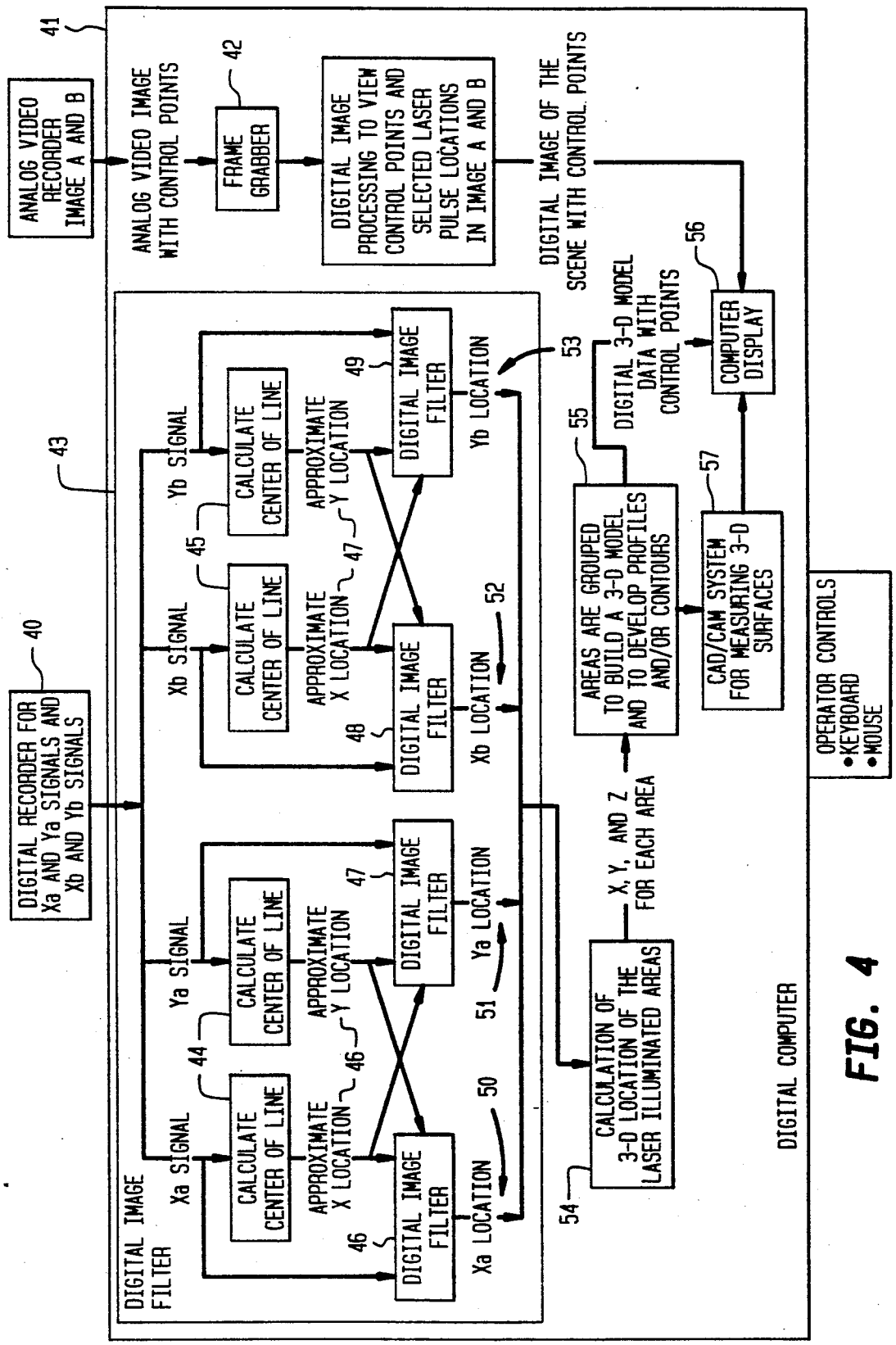

FIG. 4 describes the functional process that must be performed to calculate the exact location of each illuminated area 1 in the image plane and to create a 3-D model of the scene and register that model with other data as required.

The various digital tapes are first inserted into their respective playback units [40] interfaced to a digital computer. The digital computer [41] can range in size from a small PC to a more powerful workstation for performing rapid 3-D modeling and viewing. The digital computer is equipped with a frame grabber [42] which converts selected video frames into a digital image. The digital recorder [40] provides the files of signal recorded from each of two detectors in the modified stereo cameras. These signals are then processed by a digital image filter function [43] to find the exact location of each illuminated area. Each X and Y signal is a record of the illumination on adjacent sets of detector elements on which a focused line falls.

The first step in the data reduction process is to calculate the location of the center detector element [44, 45] of the energy recorded by the array (i.e. the center of the energy distribution will not, in most cases, be the center detector of the energized detector array. This step yields the approximate location of the illuminated area in the image plane, in both X and Y [46, 47]. An approximate location is needed because both the length of the line and the illumination distributed along a line will vary as a function of the X and Y location of the illuminated area in the image plane. The approximate location is used to derive the coefficients for a digital image filter function [46, 47, 48, 49] which separately calculates the focused location of each line. The output of the digital filter function is an X and Y location in the image plane of the illuminated area [50, 51, 52, 53].

Through the use of the conventional photogrammetric intersection equations, these values are used to calculate the respective X, Y, and Z for each laser illuminated part in the 3-D scene [54]. The various scan patterns are then rearranged so as to form an array of X, Y and Z points defining the 3-D surface of the scene [55].

This 3-D data can be registered to the actual scene or merged with another 3-D model through the use of the computer display. In both cases the operator can view the image of the 3-D scene as well as the array of the 3-D points describing the scene. A variety of processes may be performed using this digital computer facility including input to CAD/CAM systems requiring 3-D data [57].

Accuracy Analysis

A medium format camera for close range photogrammetry is the Geodetic Services, Inc. CRC-2 that has an image plane of 4.5×4.5 inches. Using a 12,000 linear detector array, a 0.000375 inch measurement can be made (4.5/12,000=0.000375) or approximately 10 microns can be measured. The accuracy can further be improved to 5 microns with two 12,000 linear detector arrays butted end to end.

For a close range photogrammetry configuration similar to the CRC-2, assume a 3 inch focal length and a camera to target distance of 30 feet or 360 inches, thus producing a scale of 1/120. With an assumed base (distance between the two stereo cameras) of 24 inches the following generalized parallax formula can be used to determine an increment of depth:

$$dh = (D^2/fb)dp$$

where "dh" is the incremental depth, "D" is the distance from the base to the object, "f" is the focal length of the camera, "b" is the base, and the "dp" is the least increment of measurement in the image plane (0.000375).

$$dh = [(120)^2/(3 \times 24)] \times 0.000375 = 0.075 \ inches$$

PLS Self Calibration

The ease of operating the PLS, in both field set up and automatic derivation on a digital computer of the data describing a 3-D scene, introduces the application of self calibration. The Field Unit can be positioned to collect data on a flat surface, such as a wall. The wall can be measured by other devices to assure it precision in establishing a mathematically defined surface (preferably a plane, but any stable surface can be used). Data can then be collected on the surface and analyzed to determine the PLS ability in deriving a known surface. This calibration process can also be extended to measure a flat surface such as a floor with the field unit positioned to view the floor at an aspect angle of 30° (this angle can be varied to calibrate for different 3-D depths). Data can then be collected on this tilted surface and analyzed to determine the PLS facility in deriving a known surface throughout a range of depths. The field unit can also be rotated about the aspect angle to analyze the system for other conditions.

The advantage of the PLS is its ability to rapidly (in less than a minute) and accurately (refer to Section 3) measure about 144 million X, Y, and Z locations in a 3-D scene without any human intervention, except for set up of the field instrumentation and operation of a digital computer to provide the desired 3-D data. The novel aspects of the PLS are:

Constant target image is realized through the use of a laser to illuminate an area (or create a target) in a 3-D scene that can be easily sensed. This insures that the recording system has a consistent target to sense thereby eliminating any object or feature recognition problems encountered in existing short range photogrammetric systems.

Digital measurement system is achieved through the use of two orthogonally placed cylindrical lenses behind a camera lens to focus an illuminated area (constant target image) as a line onto a linear detector array for the purposes of digitally recording and calculating the image plane location of the illuminated area X and Y. A digital camera of this type does not exist today.

Digital image focusing through the application of a digital image processing function (referred to as a digital image filter) to calculate the focal plane location of the central ray from the distribution of light within the line, as recorded by several adjacent linear detector elements. Digital image processing techniques can be applied because the image is a laser illuminated area which is always constant from area to area, and will only vary in the level of intensity due to variation in surface texture. This variation is a constant and is subtracted out. There may be a very low level of modulation across the illuminated area, but this type of modulation can be removed by averaging or filtering data along the line.

Self Calibration refers to the ease with which calibration can be accomplished, by measuring known surfaces. Existing short range photogrammetric systems are expensive to calibrate.

Although a single embodiment is discussed, it will be apparent to those skilled in the art that other configurations of the PLS will be possible for a variety of purposes without departing from the spirit of the invention as defined.

What is claimed is:

1. A photogrammetric laser system comprising two modified stereo cameras adjustably affixed to a rigid base structure, each of said modified stereo cameras comprising:
   a main camera lens through which energy is received from a three dimensional scene;
   a dichroic filter allowing transmission of a certain amount of received laser energy through the main camera lens from a three dimensional scene and further allowing for reflection of a majority of the laser light received from said three dimensional scene;

a video sensor to receive the transmitted light transmitted through said dichroic filter;

an analog video recorder to receive the electronic signal output from the conventional video sensor;

a 50/50 beam splitter to both reflect and transmit laser energy reflected from said dichroic filter;

a cylindrical lens oriented parallel to said rigid base structure of the photogrammetric laser system to receive reflected energy from said 50/50 beam splitter;

a cylindrical lens oriented perpendicular to said rigid base structure of the photogrammetric laser system to receive energy transmitted through said 50/50 beam splitter;

two linear detector arrays to receive the energy focused from each of said cylindrical lenses;

a digital recorder to record the output from said linear detector arrays;

said photogrammetric laser system further comprising a digital recorder playback unit to allow the digital signals recorded to be subsequently inputted for further processing;

said data passing means whereby the digital signal recorded from the linear detector arrays can be subsequently processed;

said data processing means further comprising a digital image filter means whereby calculation of the central point of the signal recorded from said linear detector arrays is accomplished and whereby the X and Y location within the image plane of each said modified stereo camera can be calculated;

said data processing means further adapted to calculate the three dimensional coordinates of any point in said three dimensional scene illuminated by said laser based upon photogrammetric data reduction techniques;

said data processing means further adapted to store the data from said digital and analog recorders.

2. The photogrammetric laser system of claim 1 wherein said data processing means further comprises an analog video frame grabber means to create a digital image of the three dimensional scene recorded by the video sensor.

3. The photogrammetric laser system of claim 2 further comprising means to annotate control points in the said digital image created from said frame grabber further comprising means to display said annotated digital image together with said X, Y and Z coordinates that are calculated based upon data received from said linear detector arrays.

4. The photogrammetric laser system according to claim 3 further comprising a CAD/CAM system for receiving X, Y and Z data calculated from the X and Y locations of said linear detector arrays to create three dimensional shapes based upon the calculated X, Y and Z data.

5. The photogrammetric laser system according to claim 1 wherein said output from the video sensor and said output from the digital stereo cameras are stored directly in the storage means of said data processing means for subsequent manipulation without the need for storing said data on tape.

6. A method of determining three dimensional locations of points in a scene comprising the steps of:

illuminating the points in the scene using a laser;

receiving reflected laser energy from the scene by two modified stereo cameras separated by a rigid adjustable shutter to prove a known base distance for subsequent calculations, each of which is modified to comprise a normal camera lens, two linear detector arrays, dichroic filters, video camera, and cylindrical lenses;

synchronizing the sampling of the linear detector arrays with the illumination of the scene by the laser such that each point in a scene is separately illuminated and recorded;

dividing the incoming laser energy received by each modified stereo camera through the normal camera lens of each said camera, using said dichroic filters of each said modified stereo camera to allow some portion of said laser energy to be received by a video camera;

further comprising the substep of recording the resulting signal from the video sensor on an analog video recorder;

said method further comprising the step of reflecting a majority of the incoming laser energy to a beam splitter means in each said modified stereo camera whereby a portion of the laser energy is reflected onto a cylindrical lens parallel to the base of the photogrammetric laser system and whereby a portion of the laser energy is transmitted to a cylindrical lens perpendicular to the base of the photogrammetric laser system;

focusing the laser energy transmitted by each cylindrical lens onto said linear detector arrays of each of said modified stereo cameras;

digitally recording the output of the linear detector arrays, determining the X, Y and Z locations of points in said scene via photogrammetric techniques.

7. The method of claim 6 further comprising the steps of digitally filtering via a digital filter means, the signal from the linear detector arrays further comprising the substeps of;

calculating the center point of the energy recorded on said linear detector arrays for each array;

calculating the X and Y location in the focal plane of each of said modified stereo cameras of all points recorded;

further comprising the step of calculating the X, Y and Z coordinates of all points in the three dimensional scene based upon conventional photogrammetric techniques.

8. The method according to claim 7 further comprising the step of inputting the analog video image data recorded on said analog video recorder to a frame grabber means whereby a digital image from said video sensor is created;

annotating the digital image from said video sensor with control points;

displaying the digital image from the video sensor together with the annotated control points in combination with the X, Y and Z data calculated from said two modified digital stereo cameras.

9. The method according to claim 8 further comprising the step of combining CAD/CAM software with the X, Y and Z data and the digital image from the video sensor to create a three dimensional display on a cathode ray tube display from the group comprising color and black and white CRT displays.

10. The method according to claim 9 further comprising the step of recording said digital data and said analog video data directly into a data processing means for immediate storage.

* * * * *